(12) United States Patent
Baek

(10) Patent No.: US 10,978,763 B2
(45) Date of Patent: Apr. 13, 2021

(54) BATTERY PACK COVER FOR AN ELECTRIFIED VEHICLE

(71) Applicant: FORD GLOBAL TECHNOLOGIES, LLC, Dearborn, MI (US)

(72) Inventor: Hyung Min Baek, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1645 days.

(21) Appl. No.: 14/602,868

(22) Filed: Jan. 22, 2015

(65) Prior Publication Data

US 2016/0218335 A1 Jul. 28, 2016

(51) Int. Cl.
*H01M 50/278* (2021.01)
*H01M 50/276* (2021.01)
(Continued)

(52) U.S. Cl.
CPC .............. *H01M 50/24* (2021.01); *B32B 7/08* (2013.01); *B32B 7/12* (2013.01); *B32B 15/08* (2013.01); *B32B 15/20* (2013.01); *B32B 27/32* (2013.01); *B60L 7/12* (2013.01); *B60L 15/20* (2013.01); *B60L 15/2009* (2013.01); *B60L 50/16* (2019.02); *B60L 50/61* (2019.02); *B60L 50/64* (2019.02); *B60L 50/66* (2019.02); *B60L 58/21* (2019.02); *H01M 50/20* (2021.01); *H01M 50/224* (2021.01); *H01M 50/227* (2021.01); *H01M 50/231* (2021.01); *H01M 50/244* (2021.01); *H01M 50/249* (2021.01); *H01M 50/262* (2021.01); *H01M 50/276* (2021.01); *H01M 50/278* (2021.01); *H01M 50/282* (2021.01); *B32B 15/085* (2013.01); *B32B 2307/20* (2013.01); *B32B 2307/30* (2013.01); *B32B 2457/10* (2013.01); *B32B 2605/00* (2013.01); *B60L 2240/36* (2013.01); *B60L 2240/423* (2013.01); *B60L 2240/443* (2013.01); *B60L 2270/147* (2013.01); *H01M 2220/20* (2013.01); *H01M 2250/20* (2013.01);
(Continued)

(58) Field of Classification Search
None
See application file for complete search history.

(56) References Cited

U.S. PATENT DOCUMENTS 5,378,555 A * 1/1995 Waters .................... B60K 1/04
180/68.5
5,542,489 A 8/1996 Allison et al.
(Continued)

FOREIGN PATENT DOCUMENTS

CN 101292387 A 10/2008
CN 20302662 6/2013

OTHER PUBLICATIONS

Chevy Volt Specifications, retrieved from http://gm-volt.com/full-specifications/ on Nov. 2, 2014.

*Primary Examiner* — Barbara L Gilliam
*Assistant Examiner* — Helen M McDermott
(74) *Attorney, Agent, or Firm* — David Kelley, Esq.; Carlson, Gaskey & Olds, P.C.

(57) ABSTRACT

An exemplary battery pack cover includes a polymer layer and a metallic layer grounded to a chassis of an electric vehicle. An exemplary method includes shielding battery cells of a battery pack against electromagnetic interference and thermal energy using a multilayer cover that is grounded to a chassis of an electrified vehicle.

15 Claims, 4 Drawing Sheets

(51) Int. Cl.
*H01M 50/282* (2021.01)
*B32B 15/085* (2006.01)
*H01M 50/24* (2021.01)
*B32B 15/20* (2006.01)
*B32B 15/08* (2006.01)
*B32B 27/32* (2006.01)
*B32B 7/08* (2019.01)
*B60L 50/64* (2019.01)
*H01M 50/20* (2021.01)
*H01M 50/227* (2021.01)
*H01M 50/231* (2021.01)
*H01M 50/224* (2021.01)
*H01M 50/244* (2021.01)
*H01M 50/249* (2021.01)
*H01M 50/262* (2021.01)
*B60L 50/60* (2019.01)
*B60L 50/16* (2019.01)
*B60L 50/61* (2019.01)
*B32B 7/12* (2006.01)
*B60L 7/12* (2006.01)
*B60L 15/20* (2006.01)
*B60L 58/21* (2019.01)

(52) U.S. Cl.
CPC ............... *Y02E 60/10* (2013.01); *Y02T 10/62* (2013.01); *Y02T 10/64* (2013.01); *Y02T 10/70* (2013.01); *Y02T 10/7072* (2013.01); *Y02T 10/72* (2013.01); *Y02T 90/40* (2013.01)

(56) References Cited

U.S. PATENT DOCUMENTS

| | | |
|---|---|---|
| 5,985,482 A | 11/1999 | Horton et al. |
| 6,276,044 B1 | 8/2001 | Ragland et al. |
| 6,593,027 B1 | 7/2003 | Osterhart et al. |
| 8,443,922 B2 | 5/2013 | Borumand et al. |
| 2005/0014061 A1 | 1/2005 | Ahn |
| 2012/0100414 A1 | 4/2012 | Sonta |
| 2012/0251863 A1* | 10/2012 | Berger ................ H01M 2/1083 429/99 |
| 2013/0135797 A1* | 5/2013 | Pavlovic ................ H05K 9/005 361/679.01 |
| 2014/0054196 A1 | 2/2014 | Schaefer |
| 2014/0329125 A1* | 11/2014 | Miyanaga ........... B60R 13/0861 429/100 |
| 2016/0021797 A1* | 1/2016 | Andre ................ H01M 2/1077 361/818 |

* cited by examiner

BATTERY PACK COVER FOR AN ELECTRIFIED VEHICLE

TECHNICAL FIELD

This disclosure is directed toward shielding a battery pack of an electrified vehicle and, more particularly, to a cover that shields from both electromagnetic interference and thermal energy.

BACKGROUND

Generally, electrified vehicles differ from conventional motor vehicles because electrified vehicles can be selectively driven using one or more battery-powered electric machines. Conventional motor vehicles, by contrast, are driven exclusively by an internal combustion engine. Electric machines can drive the electrified vehicles instead of, or in addition to, the internal combustion engines. Example electrified vehicles include all-electric vehicles, hybrid electric vehicles (HEVs), plug-in hybrid electric vehicles (PHEVs), fuel cell vehicles, and battery electric vehicles (BEVs).

A powertrain of an electrified vehicle typically includes a battery pack having battery cells that store electrical power for the electric machine. The battery pack can be exposed to electromagnetic interference and thermal energy. Materials that can provide electromagnetic and thermal shielding can be costly.

SUMMARY

A battery pack cover according to an exemplary aspect of the present disclosure includes, among other things, a polymer layer, and a metallic layer grounded to a chassis of an electric vehicle.

In a further non-limiting embodiment of the foregoing battery pack cover, the metallic layer is a foil layer.

In a further non-limiting embodiment of any of the foregoing battery pack covers, the metallic layer comprises aluminum.

In a further non-limiting embodiment of any of the foregoing battery pack covers, the polymer layer is coextensive with the metallic layer.

In a further non-limiting embodiment of any of the foregoing battery pack covers, the battery pack cover includes mechanical fasteners that secure the polymer layer and the metallic layer to a battery pack tray. The metallic layer is grounded to the chassis through the mechanical fasteners.

In a further non-limiting embodiment of any of the foregoing battery pack covers, the battery pack tray is metallic.

In a further non-limiting embodiment of any of the foregoing battery pack covers, the metallic layer is an outer layer relative to the polymer layer.

In a further non-limiting embodiment of any of the foregoing battery pack covers, the metallic layer is from three to four millimeters thick.

An assembly according to another exemplary aspect of the present disclosure includes, among other things, at least one battery array housed within a cover and a tray. The cover includes a metallic layer grounded to a chassis of an electrified vehicle.

In a further non-limiting embodiment of the foregoing assembly, the cover is grounded to the chassis through fasteners attached to the chassis.

In a further non-limiting embodiment of any of the foregoing assemblies, the assembly further comprises a motor to drive wheels of an electrified vehicle. The battery array powers the motor.

In a further non-limiting embodiment of any of the foregoing assemblies, the cover further comprises a polymer layer.

In a further non-limiting embodiment of any of the foregoing assemblies, the polymer layer is coextensive with the metallic layer.

In a further non-limiting embodiment of any of the foregoing assemblies, the polymer layer is polypropylene.

In a further non-limiting embodiment of any of the foregoing assemblies, the metallic layer is an outer layer relative to the polymer layer.

A method according to yet another exemplary aspect of the present invention includes, among other things, shielding battery cells of a battery pack against electromagnetic interference and thermal energy using a multilayered cover that is grounded to a chasses of an electrified vehicle.

In a further non-limiting embodiment of the foregoing method, an aluminum foil layer provides the shielding.

In a further non-limiting embodiment of any of the foregoing methods, the method further comprises adhering a metallic layer to a separate polymer layer to provide the multilayer cover.

In a further non-limiting embodiment of any of the foregoing methods, the metallic layer is coextensive with the polymer layer.

In a further non-limiting embodiment of any of the foregoing methods, the metallic layer is within a mold when the polymer layer is injected molded within the mold.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to electromagnetic interference and thermal energy shielding. The shielding is carried out via a cover of a battery pack. The cover has multiple layers and is relatively inexpensive.

Figure 1:
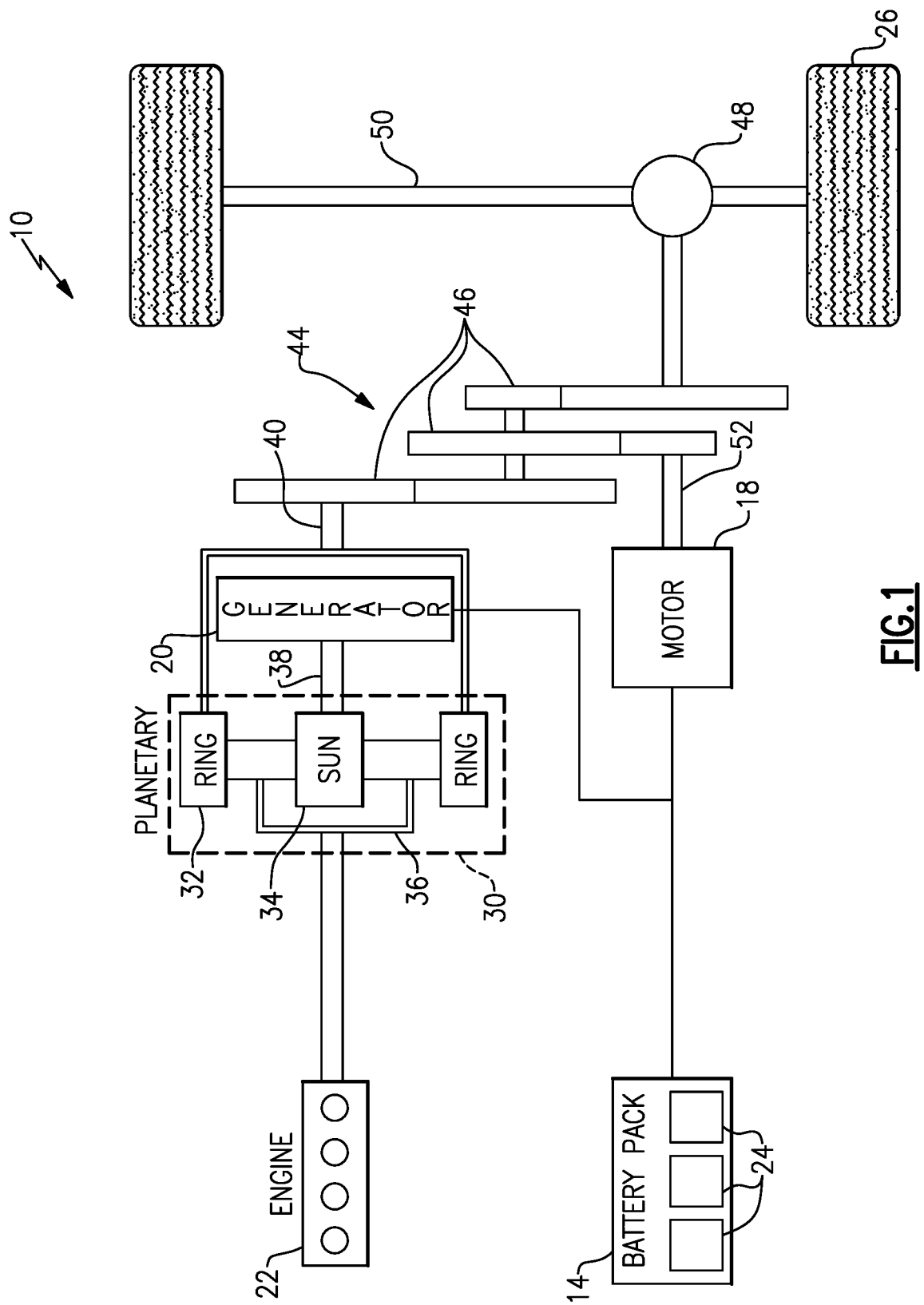
FIG. 1 shows a schematic view of an example powertrain for an electrified vehicle.

FIG. 1 schematically illustrates a powertrain 10 for a hybrid electric vehicle (HEV). The powertrain 10 includes a battery pack 14, a motor 18, a generator 20, and an internal combustion engine 22. The battery pack 14 includes a plurality of arrays 24 of battery cells.

The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, may be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable. The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

Figure 2:
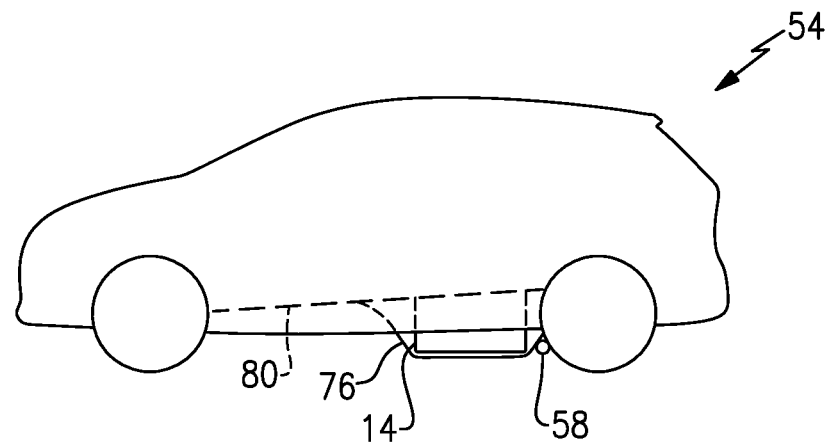
FIG. 2 shows a schematic view of an example vehicle incorporating the powertrain of FIG. 1.
Figure 3:
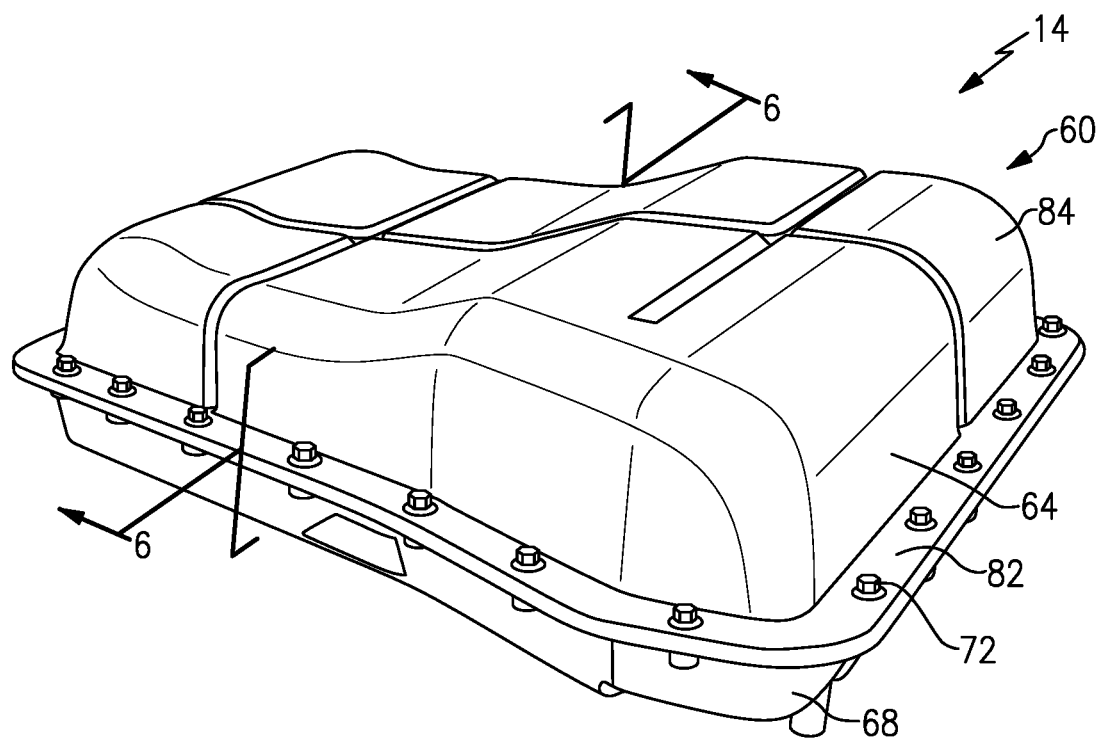
FIG. 3 shows a perspective view of a battery pack of the FIG. 1 powertrain.
Figure 4:
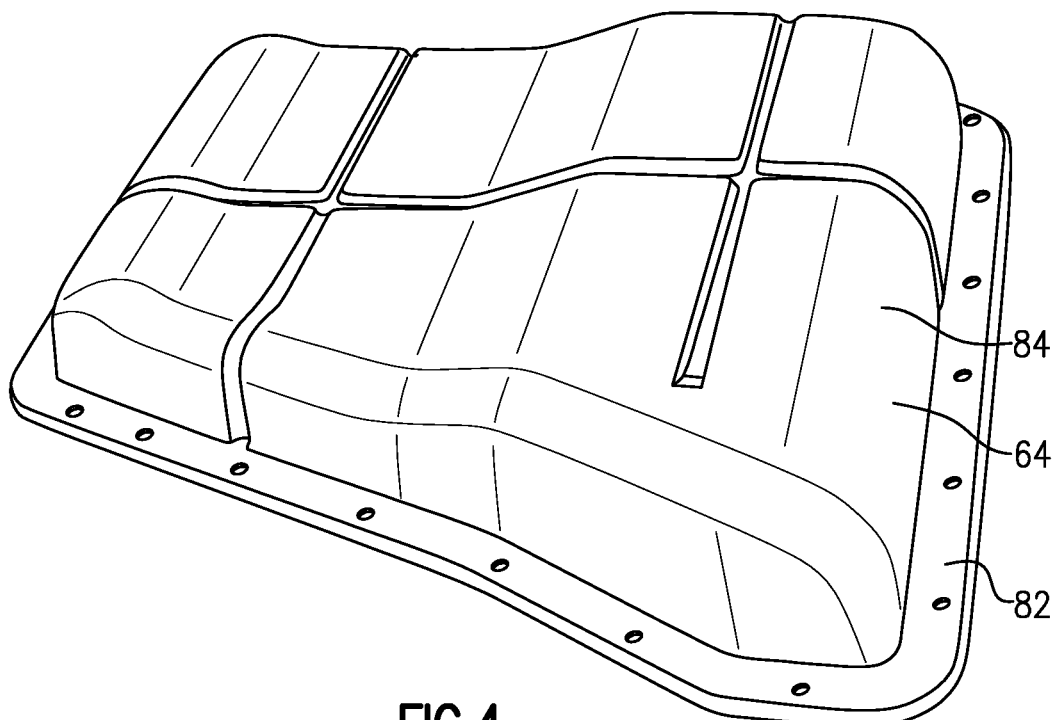
FIG. 4 shows a perspective view of an outwardly facing side of a cover of the battery pack of FIG. 3.

Referring now to FIGS. 2 to 4 with continuing reference to FIG. 1, the powertrain 10 is used within a vehicle 54. The battery pack 14 of the powertrain 10 is secured to an underside of the vehicle 54 outside a passenger compartment of the vehicle 54. In another example, the battery pack 14 is secured to another area of the vehicle 54, such as inside the passenger compartment.

The battery pack 14 may be secured to the vehicle 54 proximate a heat source, such as an exhaust pipe 58. Thermal energy from the heat source can damage battery cells within the battery pack 14. The heat source can raise temperatures proximate the battery pack 14 to as high as 90 degrees Celsius in some examples.

The battery pack 14 includes a housing assembly 60 that blocks thermal energy from entering the battery pack 14 and the battery cells. The housing assembly 60 also blocks against electromagnetic interference. The housing assembly 60 has a cover 64 and a tray 68.

Mechanical fasteners 72 secure the cover 64 to the tray 68. Straps 76 can extend along the housing assembly 60, and particularly against the tray 68, to hold the battery pack 14 to the vehicle 54. The straps 76 may be bolted directly to a chassis 80 of the vehicle.

The mechanical fasteners 72 extend through apertures in a flange 82 of the cover 64 through apertures in a corresponding flange of the tray 68.

Generally, the chassis 80 is the frame of the vehicle 54. The chassis 80 can be supported on springs and can attach to the axle 50. The chassis 80 is typically a metallic material and is used to support other components of the vehicle 54 such as the engine 22, the motor 18 and remaining portions of the powertrain 10 as well as other portions of a body of the vehicle.

The cover 64 includes multiple layers. The example cover 64 includes at least a first layer 84 and a second layer 88. The cover 64 is grounded to the chassis 80 of the vehicle 54 through the first layer 84. In other example, the second layer 88, or some combination of the first layer 84 and the second layer 88, are used to ground the cover 64 to the chassis 80.

In this example, the ground path extends from the first layer 84 of the cover 64 through the mechanical fasteners 72 to the tray 68 through the straps 76 to the chassis 80. The first layer 84, the mechanical fasteners 72, the tray 68, and the straps 76 all include a metallic material capable of providing a portion of the ground path. The cover 64 may be grounded to the chassis 80 directly through the mechanical fasteners 72 that are attached to the chassis 80.

Grounding of the battery pack 14 provides a path of low resistance to the source of electricity, which poses no hazards to humans upon unintended contact, and also a ground point so that the internal modules of the battery pack 14 are less susceptible to electromagnetic interferences coming from outside the battery pack 14, and vice versa.

In this example, the tray 68 is comprised entirely of a metallic material, which provides an effective thermal energy and electromagnetic interference shield. The metallic material is resilient to road debris, such as rocks, contacting the tray 68 during operation of the vehicle 54.

Figure 5:
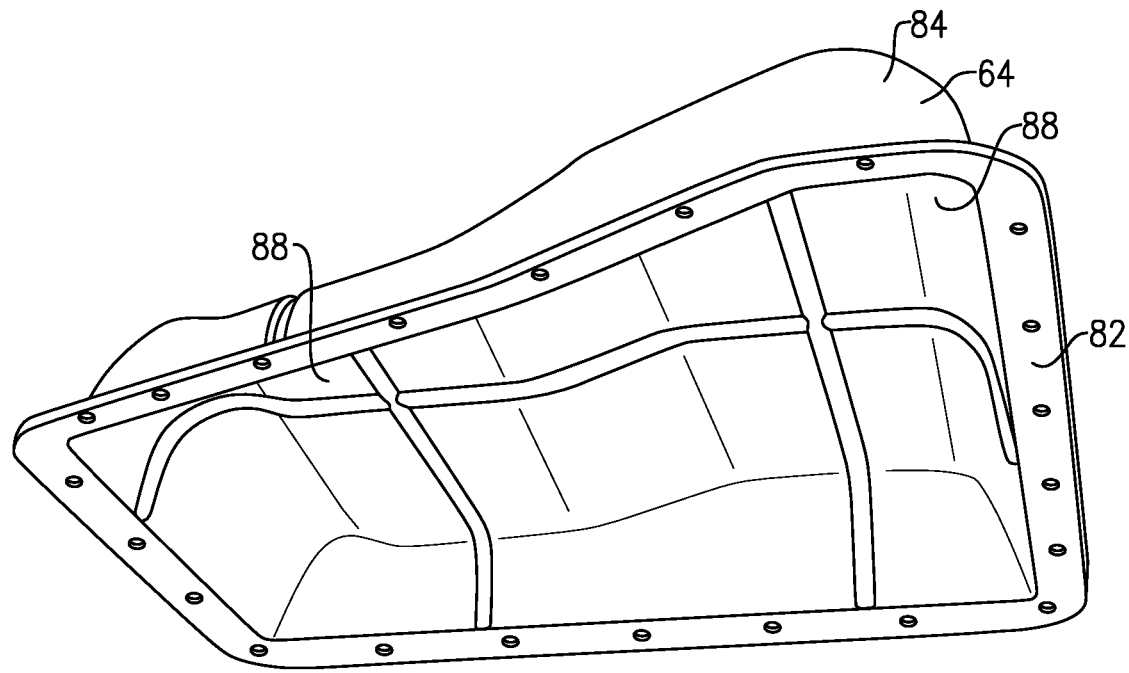
FIG. 5 shows a perspective view of an inwardly facing side of the cover of FIG. 3.
Figure 6:
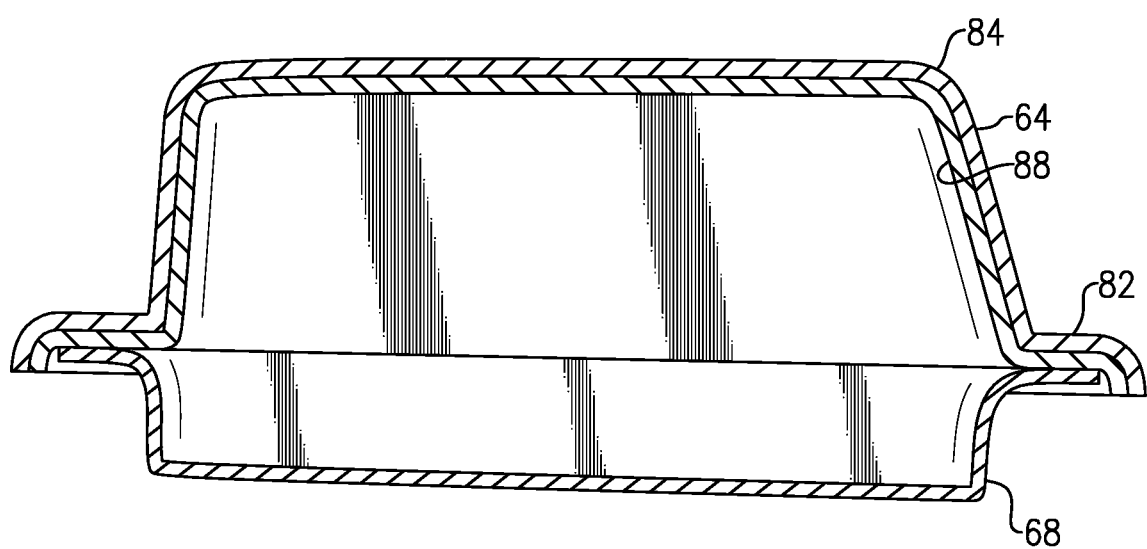
FIG. 6 shows a section view of a housing of the battery pack of FIG. 3.

Referring to FIGS. 5 and 6 with continuing reference to FIGS. 1 to 4, the cover 64 provides thermal energy and electromagnetic interference shield, but is not entirely metallic.

The first layer 84 is a metallic material, such as an aluminum foil. The first layer 84 could be thicker than a typical foil in other examples, such as from 3 to 4 millimeters.

The second layer 88, in contrast to the first layer 84, is a polymer material, such as a polypropylene. In another example, the second layer 88 is polyethylene. The polymer layer may be filled with reinforcement material to, among other things, enhance stiffness of the cover 64.

The first layer 84 of the cover 64 is an outer layer relative to the second layer 88. In another example, the second layer 88 is an outer layer relative to the first layer 84. The first layer 84 and the second layer 88 are coextensive. The first layer 84 is separate and distinct from the second layer 88.

The first layer 84 is directly secured to the second layer 88. To manufacture the cover 64, the second layer 88 may be injection molded within a mold containing a pre-formed aluminum sheet that provides the first layer 84. The second layer 88 could be a softened sheet of polymer material that is lowered into the mold rather than being injected into the mold. The process of joining the first layer 84 to the second layer 88 could be a thermoforming process in another example.

In still other examples, the second layer 88 could be formed, and then the first layer 84 applied to the outwardly facing surface of the second layer 88. This application may be by hand. The application by hand may be appropriate when the first layer 84 is an aluminum foil.

The fasteners 72 extend through both the first layer 84 and the second layer 88 and can be secured to the chassis 80. The fasteners 72 can help to secure the first layer 84 relative to the second layer.

Within the vehicle 54, the first layer 84 shields the battery pack 14 from thermal energy outside the battery pack 14. Because the first layer 84 provides shielding against thermal energy, the second layer 88 can be made from a material less resistant to thermal energy. Often, these materials, such as polypropylene, may be less expensive than other more heat resistant materials.

In some examples, the combination of the second layer 88 made of polypropylene covered by the first layer 84 of aluminum foil may provide resist thermal energy similar to if the cover 64 were made of a more heat resistant plastic such as polybutylene terephthalate or polyphenylene ether.

The first layer 84 shields against electromagnetic interference in addition to thermal energy. Electromagnetic interference emanating from controllers of the vehicle 54, for example, can interfere with operation of the battery pack 14. Correspondingly, electromagnetic interference emanating from control modules within the battery pack 14 can interfere with controllers of the vehicle 54 outside the battery pack 14.

The first layer 84 provides an effective shield against electromagnetic interference due to, among other things, its ability to create electrical continuity over the entire surface area of the cover 64. Providing a ground path from the layer 84 through the mechanical fasteners 72 to the chassis 80 of the vehicle facilitates creation of the electrical continuity across the entire surface of the cover.

Features of the disclosed examples include a multilayered cover providing heat shielding and electromagnetic interference shielding. The cover can be molded into relatively complex geometries with relatively few manufacturing steps. Utilizing the multilayered cover rather than, for example, a cover that is entirely metallic, can reduce the overall weight and cost of the battery pack.

Manufacturing the cover may include pressure driven forming such as injection molding or thermoforming, of the metallic layer into the plastic cover. These methods of attachment provide good adhesion between the layers of the cover leaving no or relatively few gaps between the layers, which can reduce NVH issues associated with the battery pack. The first layer 84 and second layer 88 can also mechanically be attached to each other via push pins and snap joints.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A battery pack, comprising:
   a polymer layer of a cover;
   a metallic layer of the cover, the metallic layer grounded to a chassis of an electric vehicle; and
   a tray secured to the cover to provide a housing having an interior, the metallic layer disposed on an outermost surface of the polymer layer, the outermost surface facing outwardly relative to the interior, the cover disposed between the tray and the chassis; and
   a plurality of mechanical fasteners that secure the polymer layer and the metallic layer to the tray, the metallic layer grounded to the chassis through the plurality of mechanical fasteners,
   wherein the tray is entirely metallic, wherein a ground path between the metallic layer and the chassis passes through the metallic layer, the mechanical fasteners, and the tray.

2. The battery pack of claim 1, wherein the metallic layer is a foil layer that is exposed.

3. The battery pack of claim 1, wherein the metallic layer comprises aluminum.

4. The battery pack of claim 1, wherein the polymer layer is coextensive with the metallic layer.

5. The battery pack of claim 1, wherein the metallic layer is separate and distinct from the polymer layer such that no portion of the metallic layer is embedded within any portion of the polymer layer, wherein the metallic layer is an outer layer relative to the polymer layer such that the polymer layer provides a boundary of the interior of the housing holding at least one battery array and the polymer layer directly faces the interior.

6. The battery pack of claim 1, further comprising at least one strap secured to the chassis and extending beneath the tray, the at least one strap securing the cover and the tray to the electric vehicle, wherein the ground path between the metallic layer and the chassis additionally passes through the at least one strap.

7. The battery pack of claim 1, wherein the polymer layer and the metallic layer are mechanically attached to each other with mechanical fasteners.

8. The battery pack of claim 1, wherein the polymer layer comprises a reinforcement material.

9. An assembly, comprising:
   at least one battery array housed within an interior provided by a cover and a tray, the cover including a metallic outermost layer relative to the interior, and a polymer innermost layer relative to the interior, the metallic outermost layer separate and distinct from the polymer innermost layer, the metallic outermost layer grounded to a chassis of an electrified vehicle, the cover disposed between the tray and the chassis; and
   a plurality of first fasteners securing the cover to the tray, at least one strap secured to the chassis with a plurality of second fasteners, the at least one strap extending beneath the tray relative to the chassis, wherein the cover is grounded to the chassis through a ground path that extends through at least one of the plurality of second fasteners attached to the chassis, the at least one strap, the tray, and at least one of the plurality first fasteners.

10. The assembly of claim 9, wherein the polymer innermost layer is coextensive with the metallic layer.

11. The assembly of claim 9, wherein the metallic outermost layer is an outer layer relative to the polymer innermost layer such that the polymer innermost layer directly faces the at least one battery array and the metallic innermost layer faces away from the at least one battery array.

12. The assembly of claim 9, wherein the tray is comprised entirely of a metallic material.

13. A method, comprising:
shielding battery cells of a battery pack against electromagnetic interference and thermal energy using a multilayer cover that is grounded to a chassis of an electrified vehicle, the multilayer cover positioned between a tray of the battery pack and the chassis, the multilayer cover secured directly to the tray, the multilayer cover having an outermost layer relative to the battery cells that is metallic; and
grounding the multilayer cover to the chassis using a ground path that extends from the multilayer cover, through the tray, and to the chassis,
wherein the ground path further extends through at least one first fastener securing the tray to the multilayer cover and a strap secured to the chassis and extending beneath the tray relative to the chassis, the strap holding the battery pack relative to the chassis.

14. The method of claim 13, wherein the outermost layer is that provides the shielding is an aluminum foil layer that is a separate and distinct layer from a polymer layer of the multilayer cover.

15. The method of claim 13, wherein the multilayer cover comprises a metallic layer as the outermost layer, the metallic layer coextensive with a polymer layer of the multilayer cover.

* * * * *